(12) United States Patent
Stolzer

(10) Patent No.: US 6,779,427 B2
(45) Date of Patent: Aug. 24, 2004

(54) APPARATUS FOR GUIDING THE SAW BAND OF A BAND SAW MACHINE

(75) Inventor: Armin Stolzer, Baden-Baden (DE)

(73) Assignee: Keuro Besitz GmbH & Co., EDV-Deinstleistungs KG, Achern (DE)

( * ) Notice: Subject to any disclaimer, the term of this patent is extended or adjusted under 35 U.S.C. 154(b) by 124 days.

(21) Appl. No.: 10/078,510

(22) Filed: Feb. 21, 2002

(65) Prior Publication Data

US 2002/0073818 A1 Jun. 20, 2002

Related U.S. Application Data

(62) Division of application No. 09/340,058, filed on Jun. 28, 1999, now abandoned.

(30) Foreign Application Priority Data

Jun. 26, 1998 (DE) .......................................... 198 28 589

(51) Int. Cl.⁷ ............................................... B26D 7/26
(52) U.S. Cl. ................................. 83/27; 83/796; 83/820
(58) Field of Search ............................ 83/27, 821, 796, 83/820, 824, 206

(56) References Cited

U.S. PATENT DOCUMENTS

| 3,878,744 A | * | 4/1975 | Luxnat ............................ 83/27 |
| 4,766,790 A | * | 8/1988 | Harris ............................ 83/56 |
| 4,899,720 A | * | 2/1990 | Chiri et al. ..................... 83/796 |
| 5,107,738 A | * | 4/1992 | Aoyagi .......................... 83/820 |
| 5,299,480 A |   | 4/1994 | Harris et al. |
| 5,410,934 A | * | 5/1995 | Krippelz ....................... 83/820 |

FOREIGN PATENT DOCUMENTS

| DE | 28 03 357 | 8/1978 |
| DE | 92 14 430 | 1/1993 |
| FR | 2 417 375 | 9/1979 |
| GB | 2 041 822 | 9/1980 |

* cited by examiner

Primary Examiner—Allan N. Shoap
Assistant Examiner—Omar Flores-Sánchez
(74) Attorney, Agent, or Firm—Vanable LLP; Robert Kinberg; Chad C. Anderson

(57) ABSTRACT

A band saw machine includes a saw band for severing a workpiece in a cutting plane; a saw band support for swinging the saw band into the cutting plane before each sawing step; clamping jaws disposed downstream of the cutting plane as viewed in the feed direction for clamping the workpiece undergoing sawing; and feed jaws for advancing the workpiece toward the cutting plane. The feed jaws are openable after closing the clamping jaws and before ending a sawing step, shiftable from the cutting plane to an extent of a successive work piece feed and closable for moving the workpiece against the feed direction away from the cutting plane after the sawing step. An arrangement shifts the saw band support away from and perpendicularly to the cutting plane toward the workpiece held spaced from and upstream of the cutting plane prior to retracting the saw band from the cutting plane.

2 Claims, 7 Drawing Sheets

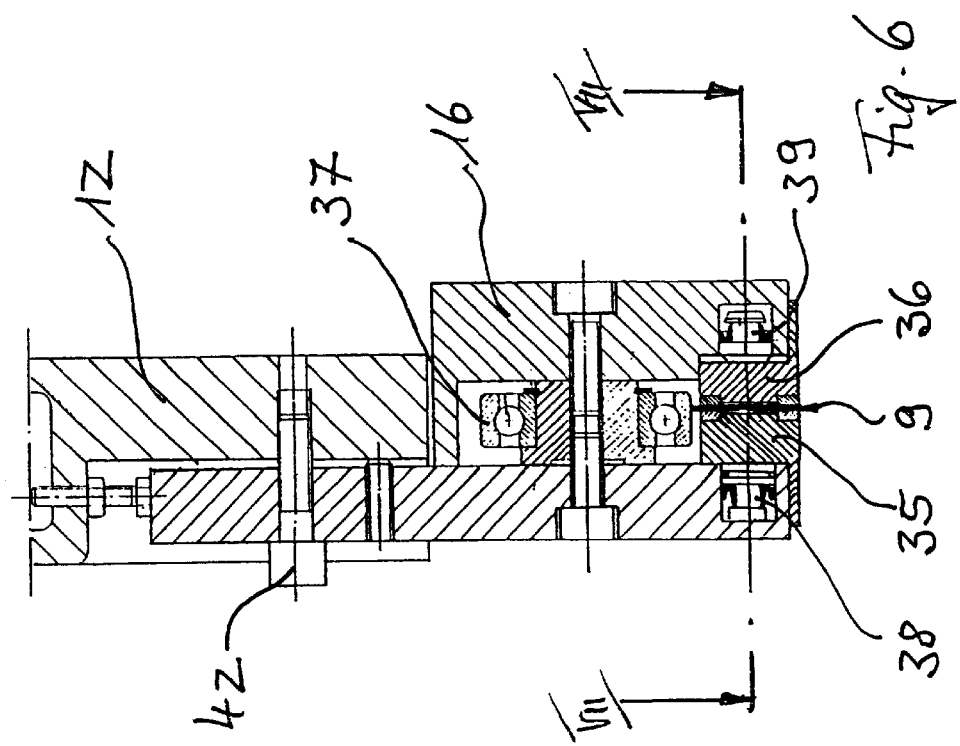
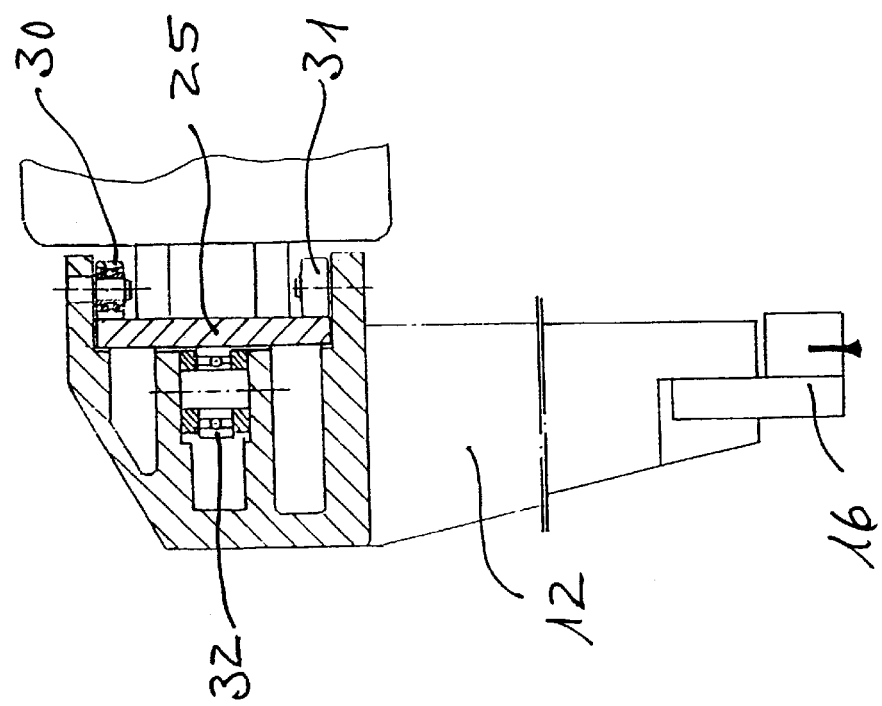

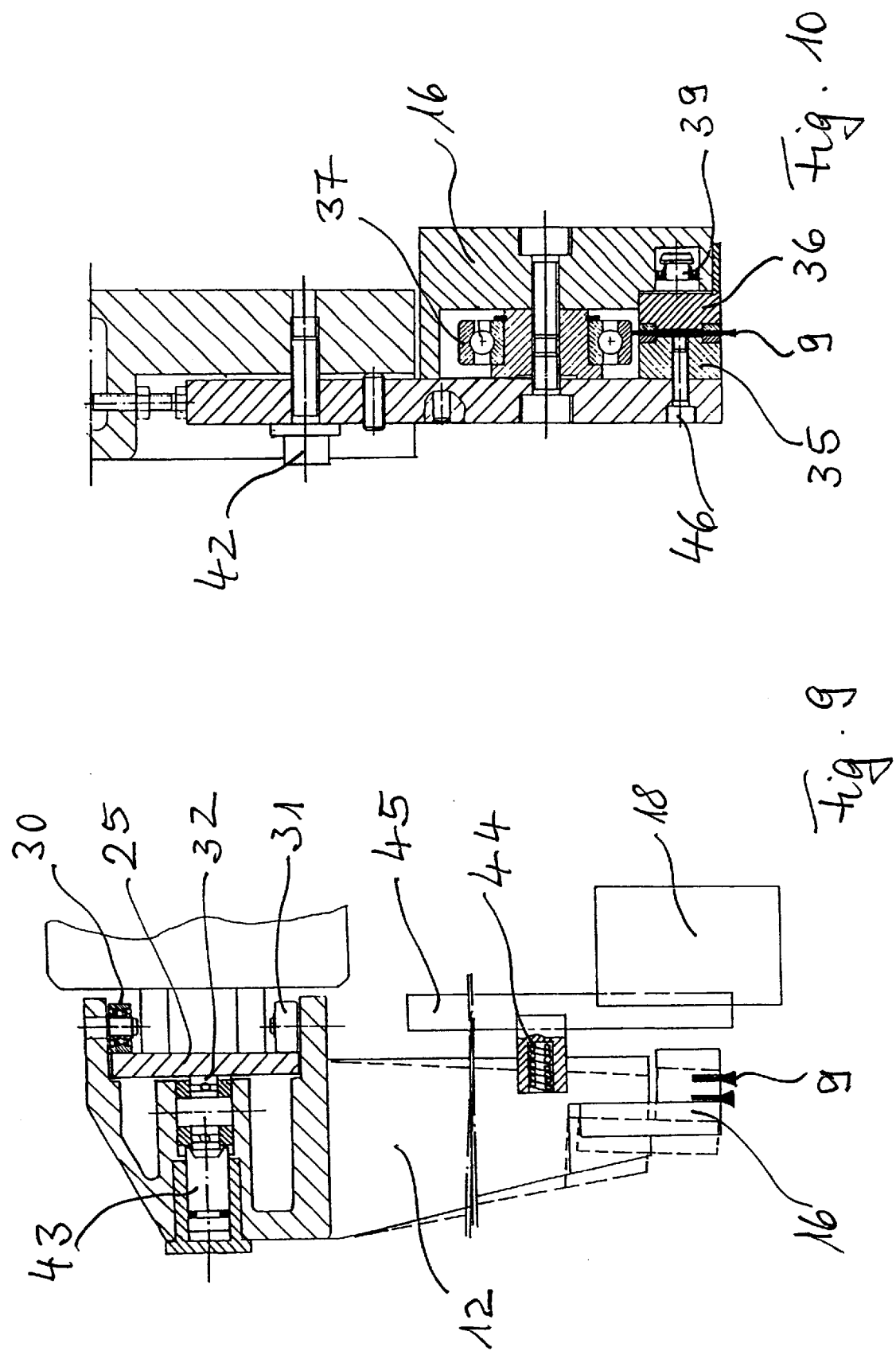

APPARATUS FOR GUIDING THE SAW BAND OF A BAND SAW MACHINE

CROSS-REFERENCE TO RELATED APPLICATION

This application is a division of application Ser. No. 09/340,058 abandoned, filed Jun. 28, 1999.

This application claims the priority of German Patent Application No. 198 28 589.2 filed Jun. 26, 1998, the subject matter of which is incorporated herein by reference.

BACKGROUND OF THE INVENTION

This invention relates to band saw machine which includes a workpiece table for supporting a workpiece advanced thereon in a feed direction; a saw band for severing the workpiece in a cutting plane on the workpiece table in consecutive sawing steps; a saw band support for swinging the saw band out of the cutting plane after each sawing step, for swinging the saw band into the cutting plane before each sawing step and for maintaining the saw band in the cutting plane during each sawing step; openable and closable cooperating clamping jaws disposed downstream of the cutting plane as viewed in the feed direction for clamping the workpiece undergoing sawing the saw band; and openable and closable cooperating feed jaws for advancing the workpiece toward the cutting plane in the feed direction. The feed jaws which are disposed upstream of the cutting plane, are, in sequence, openable after closing the clamping jaws and before termination of a cutting step, shiftable away from the cutting plane to an extent of a successive work piece feed and closable on the workpiece for moving the workpiece against the feed direction away from the cutting plane after the sawing step.

Examples of band saw machines of the aforementioned type include both so-called horizontal band saws, including those having a pivotable upper part, and so-called vertical band saws. These saws serve in sectioning a metallic workpiece material that is typically present in the form of individual metal rods or bundles of metal rods, but can also be in another form that is suitable for processing on such band saw machines.

The workpiece material is conveyed to the cutting region of the band saw machine, in which it lies on a workpiece table, by way of a conveyor track disposed upstream of the workpiece table. The separated sections are cleared on the side of the cutting plane opposite the conveyor track by advancing the previously separated section, with the advance of the workpiece material, by the amount of the section to be separated next.

In band saw machines of the discussed type, the workpiece material is held for the cutting cycle by a pair of clamping jaws that open and close transversely to the direction of material feed, but are immovable in the direction of material feed; the jaws can be disposed behind the cutting plane, in relation to the feed direction of the workpiece material. The material feed is effected by a pair of opening and closing clamping jaws which are disposed on the supply side of the material and which are displaceable in the direction of material feed.

As mentioned at the outset, in the described metal band saw machines, the saw band circulating endlessly over two running wheels is guided by saw-band guides in the cutting region next to the workpiece material, and pivoted into the cutting plane, which extends in a different direction from the circulation plane of the saw band, to assure an endless supply and removal of the workpiece material. The saw-band guides, which are advisably positioned as close as possible next to the workpiece material, generally have hard-metal sliding parts on both side of the saw band and, perpendicular to these parts, hard-metal sliding parts or running rollers against the rear of the saw band. One of the two lateral band guides is usually fixedly mounted to the associated guide arm, while the opposite band guide is either set at a fixed distance with respect to the first lateral band guide, or is pressed against the saw band by means of a spring force or a hydraulic force for guiding the saw band with as little play as possible between the two lateral band guides.

When a cutting cycle is complete, the cutting run of the saw band must be moved backward through the cutting gap again to effect the return stroke. This causes the lateral cutting edges of the saw band teeth to slide along the workpiece material; at high band speeds, the teeth are subjected to considerable wear. Moreover, when material bundles are cut, the danger always exists that the rear of the saw band will be caught on a piece of material that protrudes slightly or changes its position. Therefore, the guide arms are often equipped with sensing elements that detect the sliding of the saw band out of the band guides for avoiding severe damage to the saw band.

To remedy the above-described problems, it is already known to space the workpiece material from the cutting plane, or to move it away from the cutting plane on the supply side thereof, after the cutting cycle has ended. The material is spaced by the clamping jaws that are movable in the direction of material feed.

The spacing of the material on the supply side of the cutting plane permits the cutting run of the saw band to be free from workpiece material on at least one side during the saw-band return stroke, so it can evade edges that may be protruding, thereby reducing the wear of the side edges of the saw-band teeth. In connection with hard-metal blades, which are frequently soldered to the teeth of the saw band in contemporary machines, however, this measure is no longer sufficient. Rather, a contactless return stroke of the saw band is becoming increasingly significant.

A contactless saw-band return stroke could be attained through the spacing of the workpiece material from both sides of the cutting plane following the cutting cycle. This, however, would mean that the clamping jaw pair which is immovable in the feed direction of the workpiece material and which is disposed behind the cutting plane, would have to be adjustable in the material-feed direction, which would require a considerable structural outlay and more space.

SUMMARY OF THE INVENTION

It is therefore an object of the invention to improve the apparatus of the type mentioned at the outset such that, following the cutting cycle, the return movement of the saw band is effected in a simple, space-saving and cost-effective manner, free from any contact with the workpiece material.

Regarding the apparatus mentioned at the outset, the object is accomplished according to the invention in that, for the return stroke of the saw band, the saw band support can be shifted away from the cutting plane, perpendicularly to the cutting plane, and in the direction of the spaced workpiece material. The effect of these measures is that, starting from a one-sided spacing of the workpiece material from the cutting plane, as is the case following the cutting cycle, the saw band is freed from the workpiece material on both sides because it is adjusted in the direction of the material spacing.

Of course, in all of the embodiments of the invention, the magnitude of the adjustment of the cutting run of the saw band is dimensioned smaller than the control variable for the spacing of the workpiece material from the cutting plane. The saw band can, however, be adjusted without additional space requirements and with comparatively simple means. It is apparent that only a slight, simple adjustment to the saw-band guides is required to attain the effect sought with the invention. The adjustment of one of the two saw-band guides is basically sufficient, because the associated inclined position of the saw band suffices to free the band from the workpiece material. Of course, both guides can also be adjustable to keep the magnitude of the setting movement of the individual guides small. This measure of the invention does not necessitate additional space, because the saw-band guides are completely free in the relevant direction anyway.

According to a first solution involving an apparatus in which the saw band moves between hard-metal sliding parts inside the guides, it is provided in accordance with the invention that the hard-metal sliding parts are disposed at a respective end of setting means seated in the guides, and the setting means can be adjusted equidistantly between stops. Hydraulically- or pneumatically-actuatable cylinder-piston assemblies can be provided as setting means. In this way, the sliding guides for the saw band are merely shifted away from the cutting plane by a small amount—0.5 mm to 1.0 mm suffice—prior to the return-stroke motion of the saw band; to this end, the cylinder-piston assemblies are correspondingly actuated with the aid of the automatic control of the band saw machine. After the return stroke of the saw band has been completed, the cylinder-piston assemblies are actuated in the reverse order for guiding the saw band in the cutting plane for the next cutting cycle.

According to a different design, in which at least one of the guides is adjustable, together with the guide arm supporting it, in essentially the direction of motion of the cutting run of the saw band on a guide track of the stand of the band saw machine, in the solution offered by the invention, the adjustable guide arm can be acted upon by a force acting in the direction of the spaced workpiece material, and the guide arm can be pivoted by this force for the return stroke of the saw band. A conceivable modification of this concept involves the continuous action of the force on the guide arm, and the option of increasing the guide play of the guide arm for the return stroke of the saw band.

The effect of these measures is that, due to the increase in the guide play of the movable guide arm, the guide arm has a certain freedom of motion with respect to its guide track, and is tipped somewhat within the guide track due to the effect of the aforementioned force, resulting in the adjustment of the saw band guide, and thus of the saw band, according to the invention. Of course, the means for changing the guide play can be turned on and off automatically by the process control of the band saw machine such that the guide arm is connected to its guide track with as little play as possible for the respective cutting cycle, and the guide play is increased for the return stroke of the saw band.

If, in the design described above, the workpiece material is held next to the cutting plane during the cutting process by a pair of clamping jaws that open and close parallel to the cutting plane through the movement of at least one of the clamping jaws, but are immovable in the direction perpendicular to the cutting plane, and the movable clamping jaw and the adjustable guide arm are associated with one another, it can be provided that the movable clamping jaw at least indirectly forms the abutment for the force acting on the guide arm. The background for this is that the movable clamping jaw and the adjustable guide arm are coupled to one another here for adjusting the mutual spacing of the two band-guide arms to the cross section of the workpiece material to be processed, the cross section being reflected equally in the work position of the movable clamping jaw.

The force acting on the adjustable guide arm can be a spring force that is preferably effected by a compression spring.

BRIEF DESCRIPTION OF THE DRAWINGS

FIG. 5 is a side view of the adjustable guide arm according to FIGS. 1 through 3, partly in section.

FIG. 6 is a sectional view of the lower end of the guide arm, which guides the saw band, according to FIG. 5.

FIG. 9 is a side view of the movable guide arm according to FIGS. 1 through 3, in a different design, and partly in section.

FIG. 10 is a sectional view of the lower, guiding end of the guide arm according to FIG. 9.

DETAILED DESCRIPTION OF THE INVENTION

Figure 1:
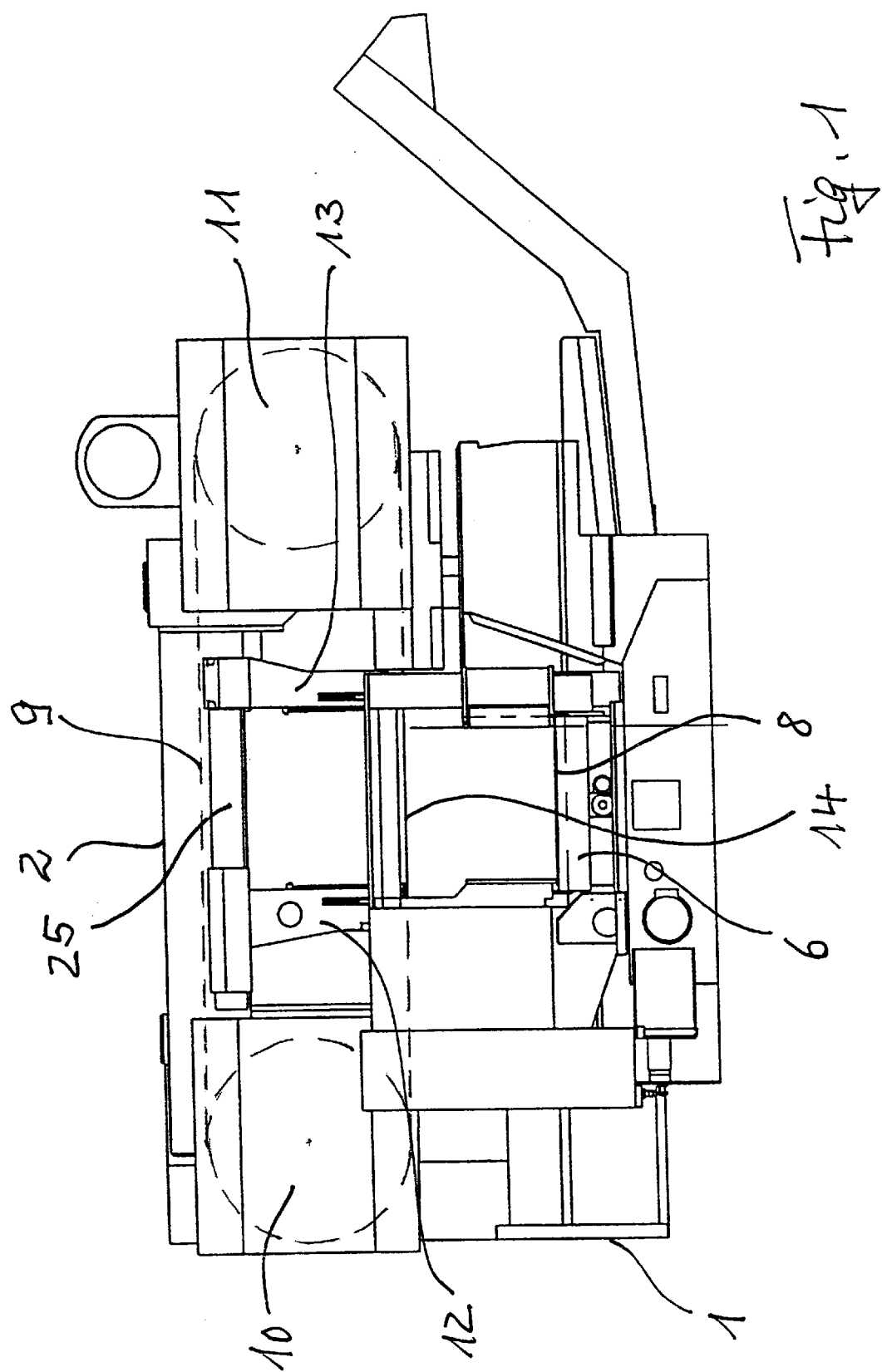
FIG. 1 is a front view of a band saw machine.
Figure 2:
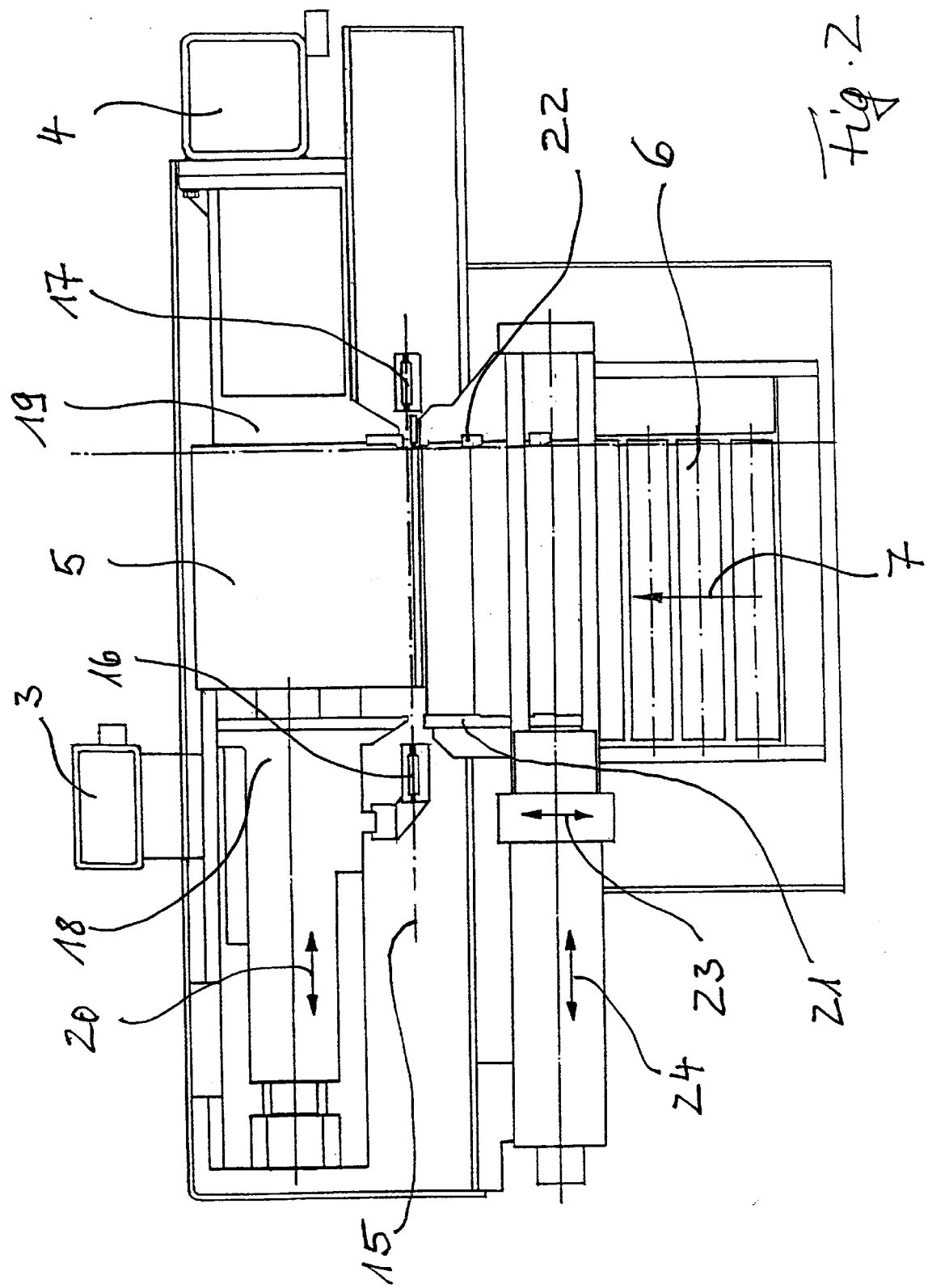
FIG. 2 is a plan view of the band saw machine according to FIG. 1.

As can be seen from FIGS. 1 and 2, the band saw machine illustrated therein has a machine stand 1, with respect to which an upper saw part 2 can be displaced vertically by way of guide columns 3, 4.

The machine stand 1 has a workpiece table 5 for supporting the workpiece material, not shown; a supply track formed from rollers 6 is disposed upstream of this table, and supplies the workpiece material to the work region of the band saw machine in the direction of the arrow 7. The upper edge 8 of the rollers 6 lies in the same plane as the surface of the workpiece table 5.

A saw band 9 circulates endlessly via deflection wheels 10, 11 in the upper saw part 2; in the present case, the deflection wheel 11 is driven to rotate counterclockwise. In the illustrated embodiment, the axes of rotation of the deflection wheels 10, 11 are oriented perpendicular to the representation according to FIG. 1, or parallel to the drawing plane of FIG. 2, respectively, so the saw band 9 correspondingly circulates, on the deflection wheels, perpendicular to the drawing plane of FIG. 1, or parallel to the drawing plane of FIG. 2, respectively. Deflection guides, which will be described in detail below and are supported by the lower, free ends of guide arms 12, 13 disposed at the upper saw part serve in pivoting the saw band, which is presently located in the cutting region above the workpiece table 5, into a position perpendicular to the surface of the workpiece table 5. These guides thus effect the downward orientation, with respect to FIG. 1, of the cutting edge 14 of the saw band 9 between the guide arms 12, 13 toward the workpiece material, not shown. The cutting plane 15 formed by this arrangement extends perpendicular to the surface of the workpiece table 5, and is shown in a dot-dash line in FIG. 2, which also shows a simplified representation of the aforementioned saw-band guides 16, 17.

In the present case, during the cutting cycle, the workpiece material is held by clamping jaws 18, 19, which are disposed as close as possible behind the cutting plane 15, with respect to the material-feed direction indicated by the arrow 7. The clamping jaw 19 is fixedly connected to the machine stand 1, while the clamping jaw 18 can open and close in the direction of the double-headed arrow 20.

With respect to the material-feed direction represented by the arrow 7, feed clamping jaws 21, 22 are further disposed on the machine stand 1 in front of the cutting plane 15; these jaws can be pushed back and forth together on the machine stand 1, parallel to the feed direction, in the manner indicated by the double-headed arrow 23. Furthermore, of these jaws, the feed jaw 21 can be displaced with respect to the clamping jaw 22, in the manner indicated by the double-headed arrow 24, for moving the pair of clamping jaws 21, 22 from the open position into the closed position, or vice versa.

The function of the band saw machine described to this point can be summed up as follows: The workpiece material lying on the rollers 6 is gripped through the closing of the feed jaws 21, 22 in the direction of the arrow 24, and is advanced by the movement of the jaws in the direction of the arrow 7 or 23 until it passes through the cutting plane 15 by the size of the material piece to be separated. The material piece to be cut off is gripped by the clamping jaws 18, 19 and held securely for the cutting cycle, which is effected while the saw band is running in that the upper saw part 2 is moved downward with respect to FIG. 1.

During the sawing cycle, the feed jaws 21, 22 can be opened and moved back, counter to the arrow direction 7, by the size of the workpiece material to be separated next in order to clamp the workpiece again prior to the end of the cutting cycle.

After completion of the cutting cycle, that is, when the cutting edge 14 of the saw band 9 has reached the surface of the workpiece table 5, the feed jaws 21, 22 draw the workpiece material they are holding back over a short distance, counter to the direction of the arrow 7, in order to make space for the saw band 9 for the return stroke, which is effected by the return of the upper saw part 2 into the upper position visible in FIG. 1. The feed jaws 21, 22 now advance the workpiece material again by the amount of the material piece to be separated next, and the described cycle begins again.

Figure 3:
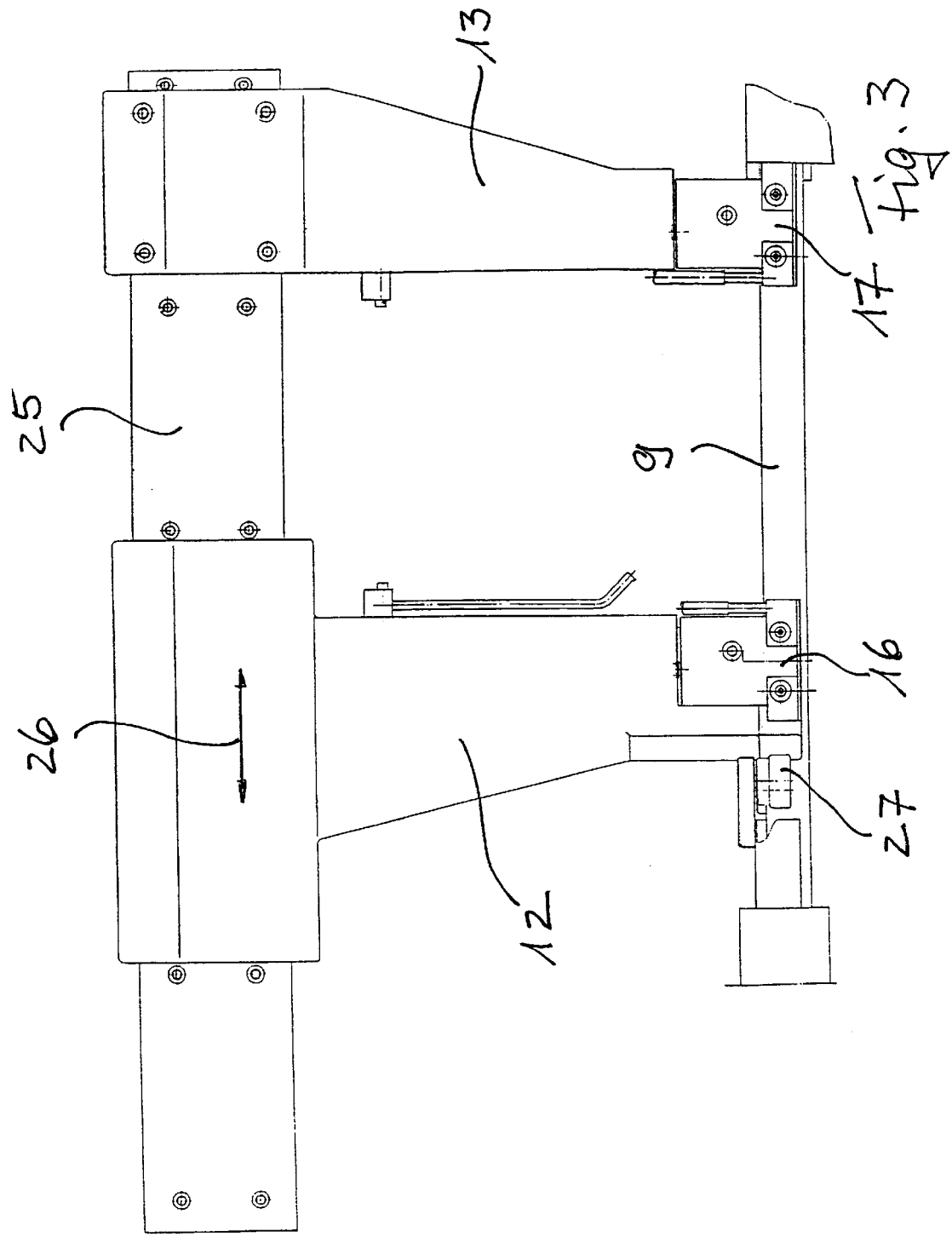
FIG. 3 is a detailed view of the saw-band guide in the work region.

FIG. 3 shows the band-guiding arms 12, 13 in detail; it is apparent that the band-guide arm 13 is fixedly connected to a guide track 25 disposed on the upper saw part 2, while the guide arm 12 is displaceable on this guide track 25 in the direction of the double-headed arrow 26. The latter serves in adapting the mutual spacing of the guide arms 12, 13, and the saw-band guides 16, 17 supported thereon, to different workpiece cross sections, so the saw-band guides 16, 17 are always positioned as closely as possible next to the workpiece material. To make the adjustment of the mutual spacing of the guide arms 12, 13 independently, the adjustable guide arm 12 is movably connected to the movable clamping jaw 18 in a manner known per se, and is therefore not shown and described in detail, so the guide arm always follows the position of this clamping jaw, which, after all, always assumes a position that corresponds to the workpiece cross section for the clamping position associated with the cutting cycle.

Corresponding to the circulating direction of the saw band 9, as mentioned above in connection with FIG. 1, the cutting run of the saw band 9 visible from FIG. 3 runs from left to right, with respect to FIG. 3, so the saw band is pivoted into the cutting plane by the saw-band guide 16. To facilitate this process, a guide roller 27 is disposed upstream of the band guide 16.

Figure 4:
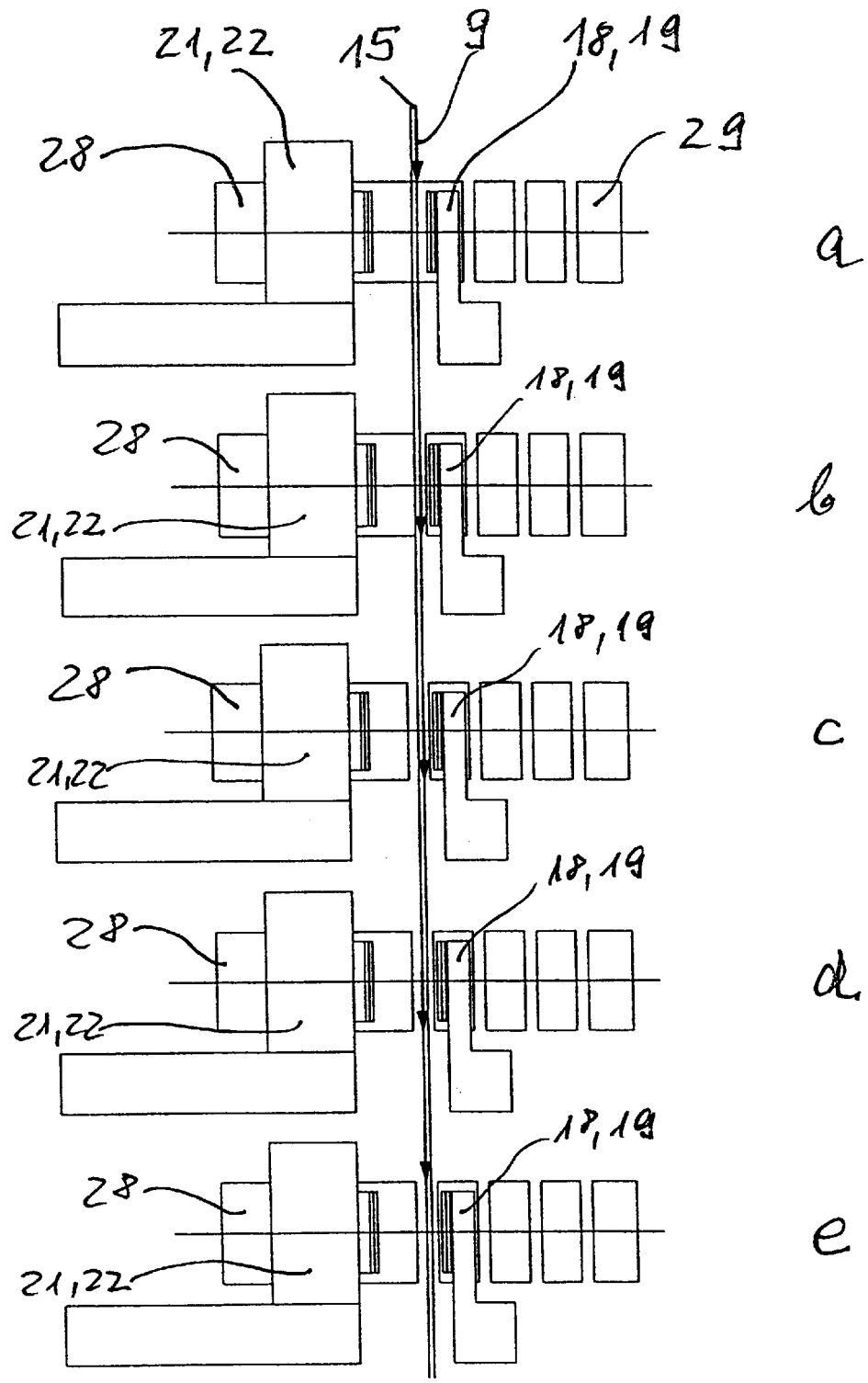
FIG. 4 is a schematic representation of the work sequence in the cutting region of the band saw.

As mentioned in the description of the band saw machine and its function, the workpiece material is spaced slightly from the cutting plane 15 at the end of the cutting cycle through the effect of the feed jaws 21, 22 in order to make more space for the return stroke of the saw band. The separated workpiece segment is, however, still held by the clamping jaws 18, 19, so its cut surface is positioned directly against the cutting plane 15, and the saw band thereby grinds against the cut surface during the return stroke. To prevent this, according to the invention, the saw band is displaced slightly out of the cutting plane, in the direction of the spaced workpiece material, for the return stroke. This procedure is apparent from the schematic representation of the work process illustrated in FIG. 4, which shows different, sequential work positions a through e.

According to FIG. 4a, the workpiece material 28 is advanced by the feed jaws 21, 22 by the amount to be cut off, through the cutting plane 15, represented here as a double line, and the piece to be cut off is gripped by the clamping jaws 18, 19. Material pieces 29 that have already been cut off, and are displaced step-wise further to the right as the machine continues to operate, can be seen to the right of the clamping jaws 18, 19. The saw band 9 represented by an arrow is located above the workpiece material.

FIG. 4b shows the cutting cycle, in which the saw band 9 is located in the cutting gap. In FIG. 4c, the cutting cycle has ended and the workpiece material 28 is spaced from the cutting plane through a slight displacement to the left with the aid of the feed jaws 21, 22. According to FIG. 4d, the saw band 9 is also shifted to the left by a slight amount, so it is released from the cutting surface of the workpiece section 29 that has just been separated, and is simultaneously spaced from the cutting surface of the workpiece material 28 to be processed. According to FIG. 4e, finally, the saw band 9 has executed a contactless return stroke. Now, with the clamping jaws 18, 19 open, the workpiece material 28 can be displaced by the amount of the material piece to be separated next. According to FIG. 4a, the next cycle can begin after the saw band 9 has been brought back into the position according to FIG. 4a, and the clamping jaws 18, 19 have gripped the material again.

FIGS. 5 through 8 show an option of modifying the adjustment of the saw band 9 with respect to the cutting plane for its return stroke. FIG. 5 shows a side view, partly in section, of the guide arm 12, which shows how the guide arm can travel via rollers 30, 31, on the one hand, and on the guide track 25, on the other hand.

The saw-band guide 16 is disposed at the lower end of the guide arm 12, which is shown in an enlarged section in FIG. 6. This guide includes, in addition to the saw band 9, hard-metal plates 35, 36 that guide the saw band, and a support roller 37 that rests against the rear of the saw band.

Figure 7:
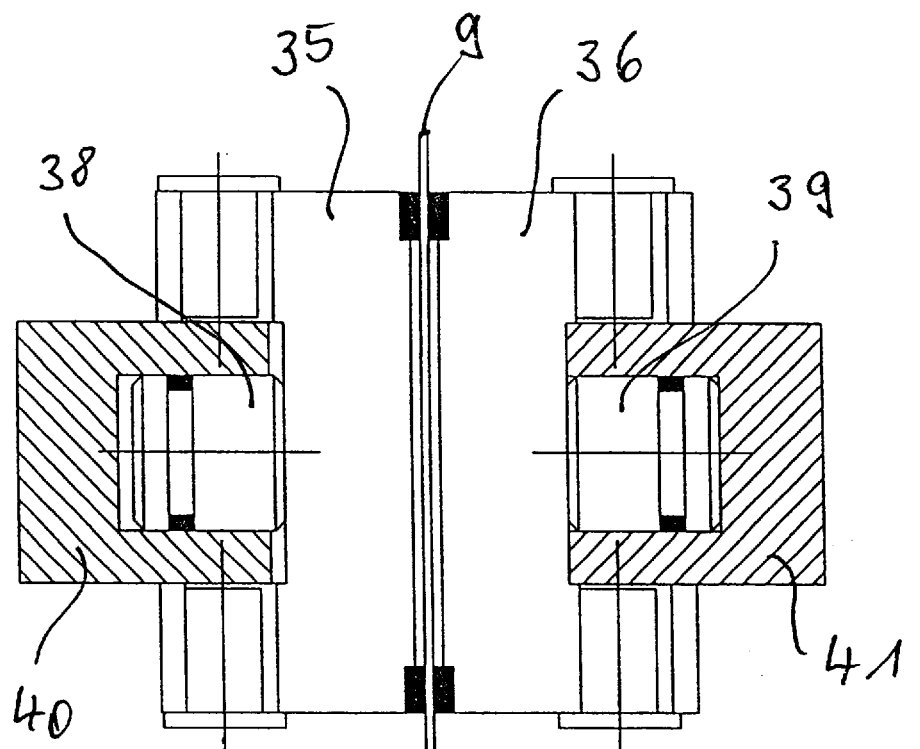
FIGS. 7 and 8 are the sectional view VII—VII from FIG. 6, in two work positions.
Figure 8:
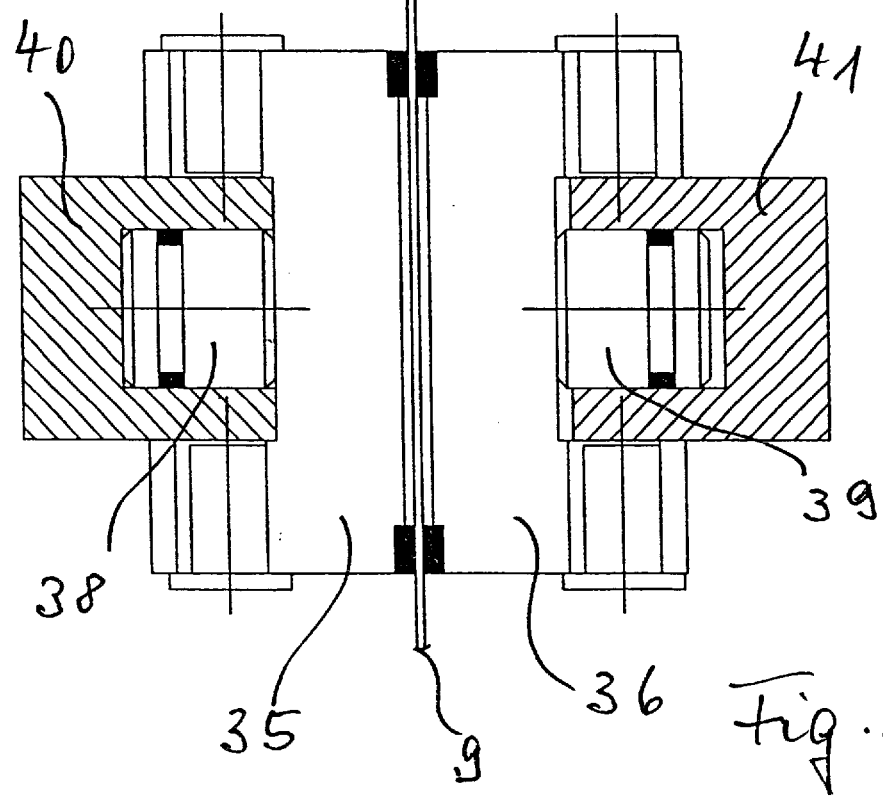

As can be seen in FIG. 6, and in enlarged cutout views in FIGS. 7 and 8, the pistons 38, 39 of cylinder-piston assemblies formed in the guide 16 act upon the hard-metal plates 35, 36 in the direction of the saw band 9, with the pistons 38, 39 being movable, in their axial direction or their direction of movement, between a front position and a backward stopped position, so the hard-metal plates 35, 36 can be moved back and forth equidistantly between the left and right stopped positions, with respect to FIGS. 5 through 8. The right stopped position shown in FIG. 7 corresponds to the position of the hard-metal plates 35, 36 that is desired for the cutting cycle, while the left stopped position shown in FIG. 8 corresponds to the position of the hard-metal plates 35, 36, which should apply for the return stroke of the saw band 9 corresponding to FIG. 4e.

As is apparent, the construction inside the saw-band guide 16, shown in FIGS. 5 through 8, permits a simple option for lifting the saw band. Of course, the movement control for the pistons 38, 39 is effected by the process control of the band saw machine, corresponding to the respective requirements.

The lifting of the saw band 9 for its return stroke following the cutting cycle is only described above in connection with the saw-band guide 16 of the guide arm 12, and is sufficient in and of itself for freeing the saw band from any contact with the workpiece material during the return stroke. Of course, a corresponding construction can also be provided for the saw-band guide 17 of the guide arm 13 with the same effect. As can be seen in greater detail in FIGS. 7 and 8, the cylinder-piston assemblies 40, 41 that include the pistons 38, 39 can be embodied as insertable parts for the guide 16. Moreover, as can be seen particularly in FIGS. 5 and 6, the guide 16 can be secured to the guide arm 12 in the form of a mounted part with the aid of screws 42 for permitting a rapid exchanging of parts, for example, as dictated by repair requirements.

Similarly to FIGS. 5 and 6, FIGS. 9 and 10 show a different option for lifting the saw band during the saw-band return stroke. To this end, the guide roller 32 of the guide for the arm 12 is pressed against the guide track 25 with the aid of a hydraulic or pneumatic piston for holding the guide of the arm 12 with as little play as possible in a normal situation. If, however, the pressure exerted by the piston 43 is eliminated or reduced, the guide of the arm 12 has some play on the guide track 25, so the guide arm 12 can be pivoted in the manner shown in a dashed line in FIG. 9 in the sense of the invention, namely in the direction of the workpiece material spaced from the cutting plane.

To effect this pivoting movement for the return stroke of the saw band 9, a compression spring 44, which abuts a support arm 45, acts on the guide arm 12; the support arm is in turn connected to the clamping jaw 18 that is displaceable transversely to the material-feed direction.

of course, the pressure exerted by the piston 43 on the roller 32 can only be reduced if the return stroke of the saw band 9 follows the cutting cycle. The corresponding control of the pressure exerted by the piston 43 is again effected by the control device for the band saw machine.

If the saw band 9 is to be brought to the cutting plane again for the next cutting cycle, the roller is again clamped against the guide track 25 due to the pressure exerted by the piston 43, which leads to a backward pivoting of the guide arm 12 into the position illustrated in FIG. 9.

Finally, FIG. 10 again shows the lower end of the guide arm illustrated in FIG. 9, along with the guide 16, which is embodied identically to the embodiment shown in FIG. 6, except for the fact that, in FIG. 10, the hard-metal plate 35 is fixedly connected to the guide 16 by means of a screw 46, for example, while only the hard-metal plate 36 can be pressed against the saw band by a hydraulically- or pneumatically-actuatable piston 39. This arrangement merely serves, in a known manner, in guiding the saw band 9 with as little play as possible between the hard-metal plates 35, 36.

The invention was explained with reference to drawings and only in connection with a specific type of band saw machine. It is, however, applicable, with the same means, to types of band saw machines other than those mentioned in the introduction to the specification, particularly to vertical band saws.

It will be understood that the above description of the present invention is susceptible to various modifications, changes and adaptations, and the same are intended to be comprehended within the meaning and range of equivalents of the appended claims.

What is claimed is:

1. A band saw machine including:
    (a) a workpiece table for supporting a workpiece advanced thereon in a feed direction;
    (b) a saw band for severing the workpiece in consecutive sawing steps in a cutting plane on the workpiece table;
    (c) saw band supporting means for swinging the saw band out of the cutting plane after each sawing step, for swinging the saw band into the cutting plane before each sawing step and for maintaining the saw band in the cutting plane during each sawing step;
    (d) openable and closable cooperating clamping jaws disposed downstream of the cutting plane as viewed in said feed direction for clamping the workpiece undergoing sawing by said saw band;
    (e) openable and closable cooperating feed jaws for advancing the workpiece toward said cutting plane in said feed direction, said feed jaws being disposed upstream of said cutting plane, said feed jaws being, in sequence, openable after closing said clamping jaws before termination of a cutting step, shiftable away from said cutting plane to an extent of a successive work piece feed and closable on the workpiece for moving the workpiece against said feed direction away from said cutting plane after the sawing step; and
    (f) shifting means for shifting said saw band supporting means away from and perpendicularly to said cutting plane toward the workpiece held spaced from and upstream of said cutting plane prior to swinging said saw band out of said cutting plane,
    wherein said saw band supporting means comprises guide arms and saw band guides carried by respective said guide arms; said means for shifting said saw band supporting means includes means for shifting at least one of said band guides away from and perpendicularly to said cutting plane toward the workpiece held spaced from and upstream of said cutting plane prior to swinging said saw band out of said cutting plane,
    wherein the band saw machine includes a stand, the apparatus further comprising a guide track for being disposed on the stand, at least one of the saw band guides, along with the guide arm that supports it, being essentially displaceable on the guide track of the stand in the direction of movement of the cutting run of the saw band,
    wherein the guide arm of at least one saw band guide that is displaceable on the guide track comprises a shiftable guide arm that can be acted upon by a force acting in the direction of the spaced workpiece material, and the shiftable guide arm is pivotally mounted so that it can be pivoted by said force for a return stroke of the saw band,
    the apparatus further comprising a spring for exerting the force acting on the shiftable guide arm.

2. The apparatus according to claim 1, wherein the spring comprises a compression spring.

* * * * *